US012591708B2

(12) United States Patent　　　　(10) Patent No.:　US 12,591,708 B2
Beach et al.　　　　　　　　　　　　(45) Date of Patent:　　Mar. 31, 2026

(54) PERSONAL DATA ANONYMIZATION WITH MODEL VERIFICATION

(71) Applicant: Twilio Inc., San Francisco, CA (US)

(72) Inventors: Aaron Beach, Lakewood, CO (US);
Liyuan Zhang, San Mateo, CA (US);
Tiffany Callahan, Boulder, CO (US);
Mengda Liu, Pittsburgh, PA (US);
Shruti Vempati, Denver, CO (US)

(73) Assignee: Twilio Inc., San Francisco, CA (US)

( * ) Notice: Subject to any disclaimer, the term of this patent is extended or adjusted under 35 U.S.C. 154(b) by 542 days.

(21) Appl. No.: 17/095,185

(22) Filed: Nov. 11, 2020

(65) Prior Publication Data

US 2022/0147654 A1　　May 12, 2022

(51) Int. Cl.
*G06F 21/62*　　　　(2013.01)
*G06N 20/00*　　　　(2019.01)

(52) U.S. Cl.
CPC ......... *G06F 21/6254* (2013.01); *G06N 20/00*
(2019.01)

(58) Field of Classification Search
CPC ............................ G06F 21/6254; G06N 20/00
See application file for complete search history.

(56) References Cited

U.S. PATENT DOCUMENTS

| | | | | |
|---|---|---|---|---|
| 10,565,398 | B2 * | 2/2020 | Huang | G06F 16/285 |
| 10,970,414 | B1 * | 4/2021 | Lesner | G06F 21/602 |
| 11,250,162 | B2 * | 2/2022 | Praveen | G06F 18/23 |
| 11,483,294 | B2 * | 10/2022 | Karabatis | G06F 21/6263 |
| 11,755,766 | B2 * | 9/2023 | Kulkarni | G06F 16/90344 |
| | | | | 726/26 |
| 11,757,816 | B1 * | 9/2023 | Lin | H04L 63/12 |
| | | | | 709/206 |
| 2007/0266079 | A1 * | 11/2007 | Criddle | G06Q 10/107 |
| | | | | 709/203 |
| 2009/0240637 | A1 * | 9/2009 | Drissi | G06F 16/353 |
| | | | | 706/12 |

(Continued)

FOREIGN PATENT DOCUMENTS

| | | | | |
|---|---|---|---|---|
| CN | 110430224 A | * | 11/2019 | H04L 41/142 |
| EP | 3340561 A1 | * | 6/2018 | H04L 63/0407 |

(Continued)

OTHER PUBLICATIONS

Ren et al., "ReCon: Revealing and Controlling PII Leaks in Mobile Network Traffic", arXiv, pp. 1-18 (Year: 2016).*

*Primary Examiner* — Yin Chen Shaw
*Assistant Examiner* — Alex D Carrasquillo
(74) *Attorney, Agent, or Firm* — Lowenstein Sandler LLP

(57) ABSTRACT

Anonymization is the process to remove personal information from the data. Once the data is anonymized, the data may be used for creating machine-learning models without the risk of invading anyone's privacy. One of the keys to data anonymization is to make sure that the data is really anonymized so nobody could use the anonymized data to obtain private information. Different techniques for data anonymization are presented. Further, the data anonymization techniques are tested for true anonymization by comparing the results from these techniques to a random method of guessing. If the difference in the results is below a predetermined threshold margin, the data anonymization techniques are safe and ready for use.

17 Claims, 13 Drawing Sheets

PII DETECTION IN EMAIL SUBJECT

(56)  References Cited

U.S. PATENT DOCUMENTS

| | | | | |
|---|---|---|---|---|
| 2010/0036884 A1* | 2/2010 | Brown | G06Q 30/00 | |
| | | | | 707/771 |
| 2010/0162402 A1* | 6/2010 | Rachlin | G06F 21/60 | |
| | | | | 726/26 |
| 2010/0318489 A1* | 12/2010 | De Barros | G06N 5/04 | |
| | | | | 706/50 |
| 2014/0040172 A1* | 2/2014 | Ling | G06N 5/022 | |
| | | | | 706/12 |
| 2014/0115710 A1* | 4/2014 | Hughes | G06F 21/6254 | |
| | | | | 726/26 |
| 2014/0115715 A1* | 4/2014 | Pasdar | G06F 21/85 | |
| | | | | 726/26 |
| 2014/0280261 A1* | 9/2014 | Butler | G06F 21/6245 | |
| | | | | 707/756 |
| 2017/0024581 A1* | 1/2017 | Grubel | G06F 16/24578 | |
| 2017/0359313 A1* | 12/2017 | Livneh | H04L 63/0414 | |
| 2018/0255010 A1* | 9/2018 | Goyal | H04L 51/212 | |
| 2018/0314853 A1* | 11/2018 | Oliner | G06F 21/6254 | |
| 2019/0050599 A1* | 2/2019 | Canard | H04L 9/0861 | |
| 2020/0050966 A1* | 2/2020 | Enuka | G06Q 10/10 | |
| 2020/0082290 A1* | 3/2020 | Pascale | G06N 20/00 | |
| 2021/0075824 A1* | 3/2021 | Ibrahim | G06N 5/02 | |
| 2021/0173854 A1* | 6/2021 | Wilshinsky | G06F 21/6254 | |
| 2022/0277097 A1* | 9/2022 | Cabot | H04W 12/02 | |

FOREIGN PATENT DOCUMENTS

| | | | | | |
|---|---|---|---|---|---|
| EP | 3477530 A1 * | 5/2019 | | G06F 16/285 | |
| WO | WO-2015077542 A1 * | 5/2015 | | G06F 16/9535 | |

* cited by examiner

ANONYMOUS EMBEDDING

WORD 402

SEMANTIC ANALYSIS 404

WORD VECTOR 406

TEXT DOCUMENT 408

COMBINE VECTORS 410

TEXT VECTOR 412

ANONYMOUS EMBEDDINGS ARE IRREVERSIBLE TRANSFORMATIONS OF DISCRETE CATEGORICAL VARIABLES (E.G., WORDS) INTO A VECTOR OF NUMBERS

WITHOUT ANONYMIZATION EACH COMPANY USES ITS OWN DATA

WITH ANONYMIZATION COMPANIES SHARE DATA

TESTING DATA ANONYMIZATION

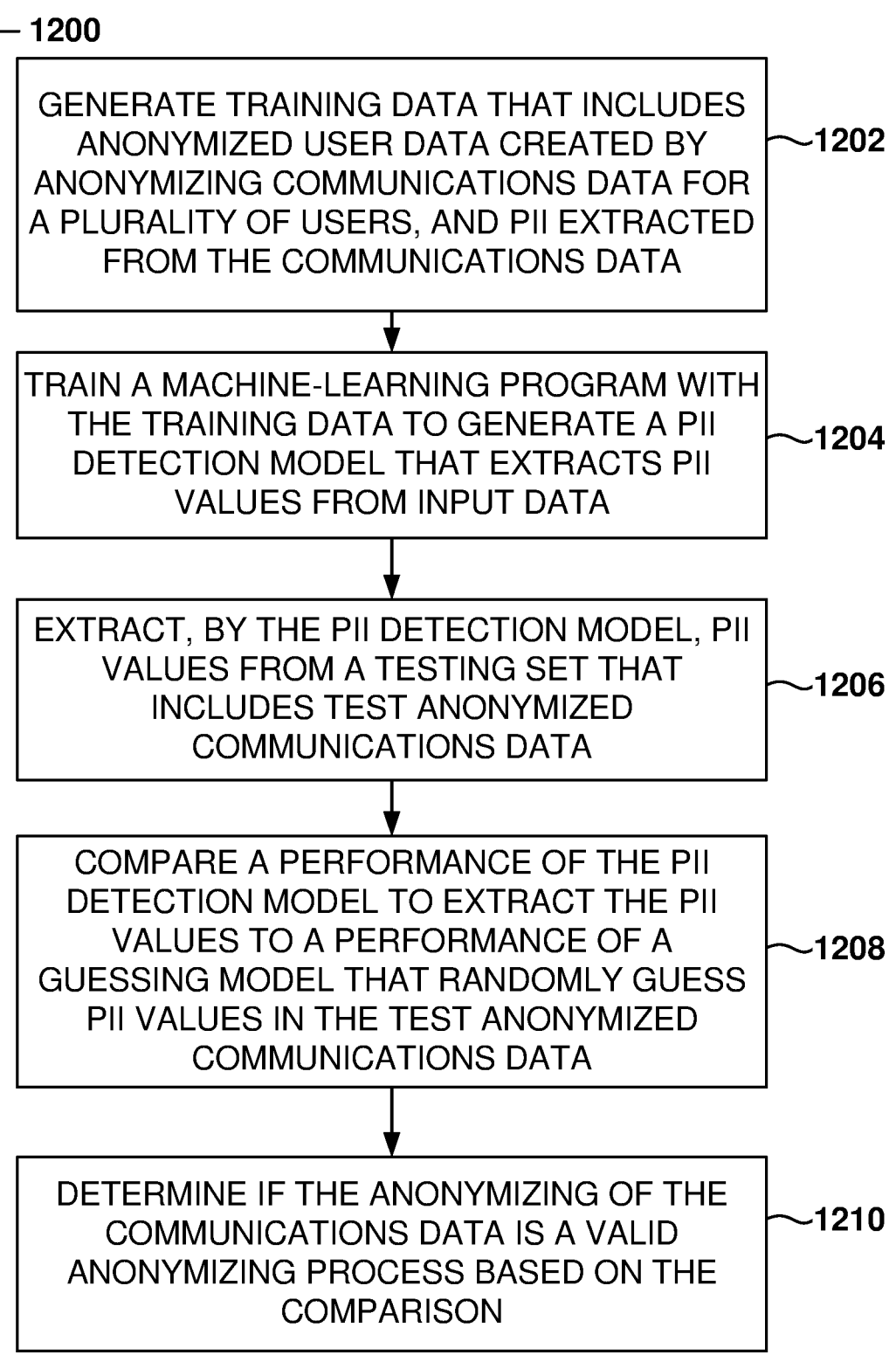

1200

GENERATE TRAINING DATA THAT INCLUDES ANONYMIZED USER DATA CREATED BY ANONYMIZING COMMUNICATIONS DATA FOR A PLURALITY OF USERS, AND PII EXTRACTED FROM THE COMMUNICATIONS DATA    ~1202

TRAIN A MACHINE-LEARNING PROGRAM WITH THE TRAINING DATA TO GENERATE A PII DETECTION MODEL THAT EXTRACTS PII VALUES FROM INPUT DATA    ~1204

EXTRACT, BY THE PII DETECTION MODEL, PII VALUES FROM A TESTING SET THAT INCLUDES TEST ANONYMIZED COMMUNICATIONS DATA    ~1206

COMPARE A PERFORMANCE OF THE PII DETECTION MODEL TO EXTRACT THE PII VALUES TO A PERFORMANCE OF A GUESSING MODEL THAT RANDOMLY GUESS PII VALUES IN THE TEST ANONYMIZED COMMUNICATIONS DATA    ~1208

DETERMINE IF THE ANONYMIZING OF THE COMMUNICATIONS DATA IS A VALID ANONYMIZING PROCESS BASED ON THE COMPARISON    ~1210

FIG. 12

PERSONAL DATA ANONYMIZATION WITH MODEL VERIFICATION

TECHNICAL FIELD

The subject matter disclosed herein generally relates to methods, systems, and machine-readable storage media for protecting user data.

BACKGROUND

The amount of data collected by businesses and government keeps growing, and this data can be useful to solve business and other types of problems, such as using machine-learning (ML) models that find correlations in the data to help estimate possible outcomes.

However, data often contains Personally Identifiable Information (PII), which is any data that can be used to identify a specific individual. Examples of PII include name, Social Security numbers, mailing address, email address, phone number, Internet Protocol (IP) address, login identifiers (IDs), Global Positioning System (GPS) information, etc.

Protecting privacy of people is an important concern, so before the data is used for business or government purposes, there may be a need for the data to be anonymized to enable the use of the data without compromising privacy.

BRIEF DESCRIPTION OF THE DRAWINGS

Various of the appended drawings merely illustrate example embodiments of the present disclosure and cannot be considered as limiting its scope.

FIG. 12 is a flowchart of a method for testing if a data set is anonymized, according to some example embodiments.

DETAILED DESCRIPTION

Example methods, systems, and computer programs are directed to anonymizing data. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Some companies accumulate large amounts of data derived from their business operations, and this data may be used to improve business operations, such as by creating machine-learning (ML) models to generate predictive or other data, which can assist in decision making. However, some of this data may include private information that the companies are not able to use (e.g., based on privacy policies, rules, or laws). Anonymization is the process to transform data with personal information such that the personal information is not identifiable in the transformed data. GDPR Recital 26 states, "The principles of data protection should therefore not apply to anonymous information, namely information which does not relate to an identified or identifiable natural person or to personal data rendered anonymous in such a manner that the data subject is not or no longer identifiable."

Once the data is anonymized, the data may be used for creating models without the risk of invading anyone's privacy. One of the keys to data anonymization is to make sure that the data is really anonymized so nobody could use the anonymized data to obtain private information. In some aspects, different techniques for data anonymization are presented. Further, the data anonymization techniques are tested for true anonymization by comparing the results from these techniques to a random method of guessing. If the difference in the results is below a predetermined or configurable threshold margin, the data anonymization techniques are safe and ready for use.

Figure 1:
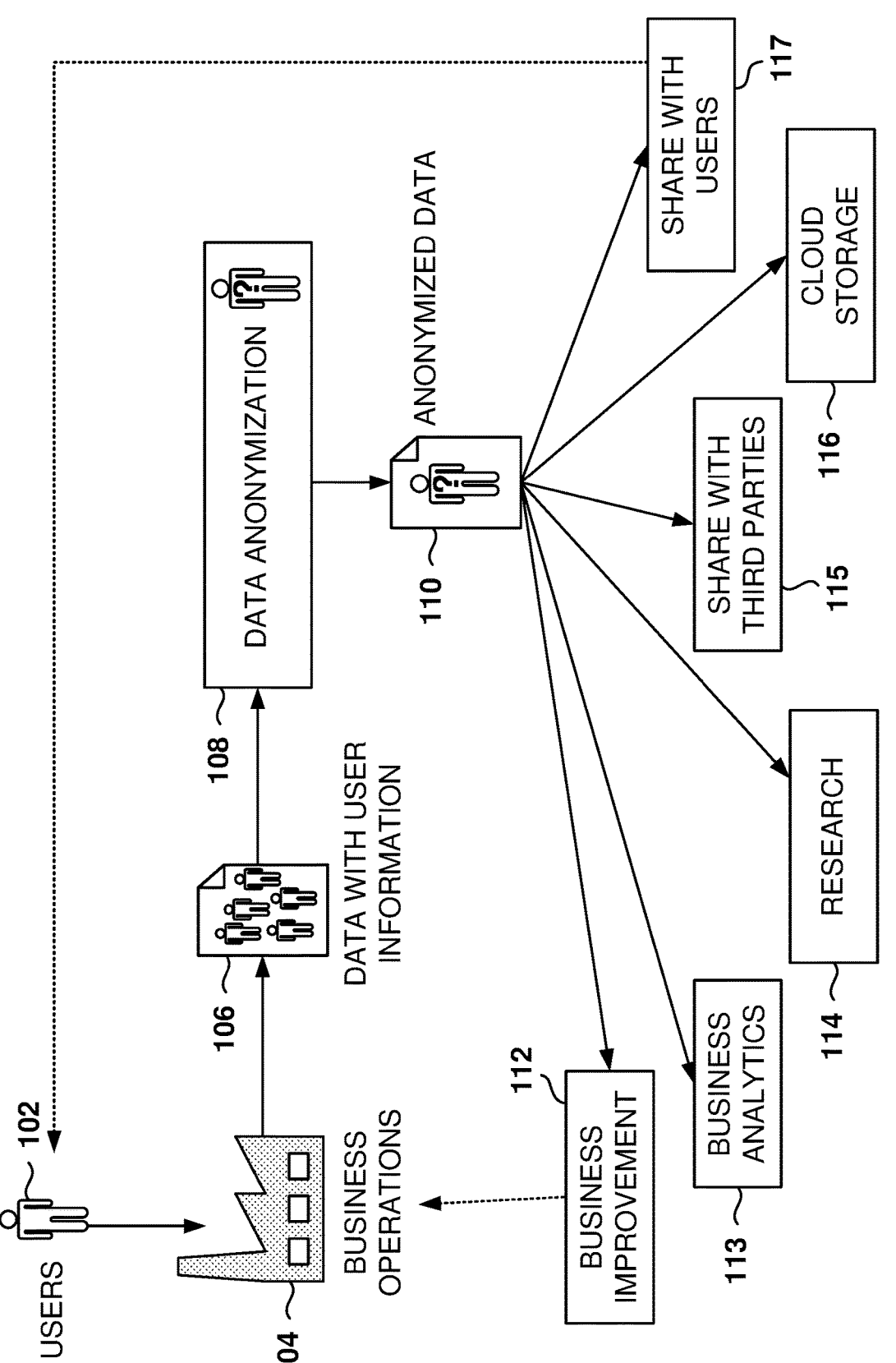
FIG. 1 illustrates the possible utilization of user data for business purposes, according to some example embodiments.

FIG. 1 illustrates the possible utilization of user data for business purposes, according to some example embodiments. During business operations, the company obtains data with user information 106. The data might be for clients of the company or for clients of the client, such as in the case of a service provider that performs services for other clients (e.g., email sender service).

When the data with user information 106 is anonymized, the result is anonymized data 110 that does not have information in the data that can lead others to user private information. Data anonymization 108 is the process of removing personal information from raw data. The resulting anonymized data 110 cannot be associated with any individual or company.

Personal data may include any information that can lead to the identification of an individual, a group of individuals, a company, or some other organization. Personal data is referred to as Personally Identifiable Information (PII). The personal data may include direct identifiers, such as the person name, last name, email address, phone number, Social Security number, etc. The personal data may also include indirect identifiers such as date of birth, gender, ZIP Code, etc. Sensitive personal data may include data that could cause harm or embarrassment to an individual, such as political beliefs, genetic data, health information, sexual orientation, etc. For businesses, sensitive data may include any data that may cause a threat to the company if discovered by others, such as trade secrets, customer information, etc.

Personal data that has been rendered anonymous in such a way that the individual is not or no longer identifiable is no longer considered personal data. For data to be truly anonymized, the anonymization must be irreversible.

If it is proven that data is anonymous, then the laws of privacy do not apply anymore, such as General Data Protection Regulation (GDPR) and ePrivacy.

The anonymized data 110 can be used for multiple purposes, such as for business improvement 112, business analytics 113, and research 114, e.g., to build models that generate predictive or other data to help the business improve operations. Further, since personal data is now protected, the anonymized data 110 can be shared with third parties 115, shared with users 102, and be stored in the cloud 116 (e.g., stored by third parties).

Figure 2:
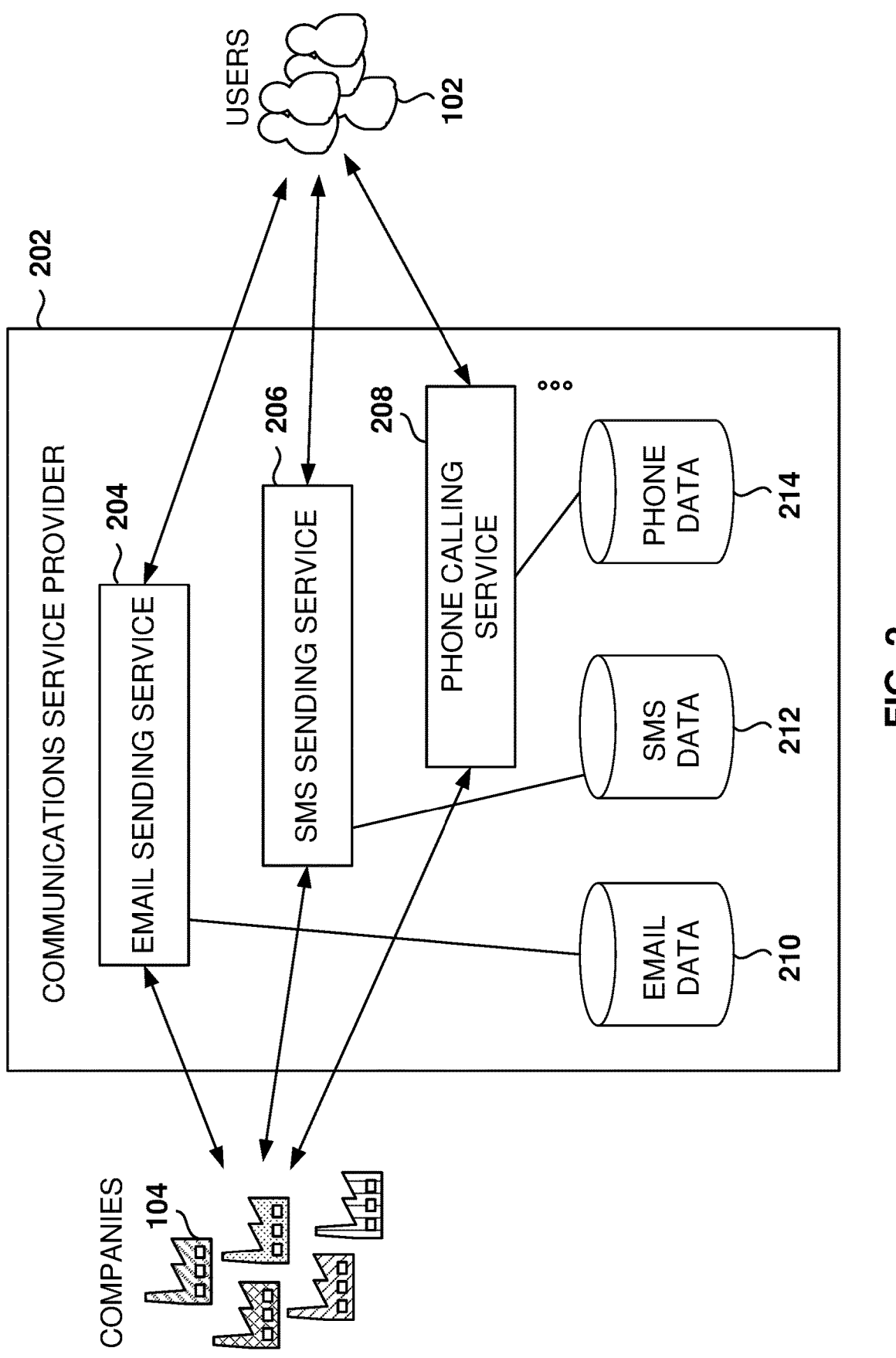
FIG. 2 shows different types of data used by a communications service provider, according to some example embodiments.

FIG. 2 shows different types of data used by a communications service provider, according to some example embodiments. In some example embodiments, a communications service provider 202 provides services to companies 104 exchange communications with users 102.

In some example embodiments, the communication services include email sending service 204, a Short Message Service (SMS) sending service 206, and a phone calling service 208. The communications may flow from the companies 104 to the users 102 or from the users 102 to the companies 104. It is noted that the embodiments illustrated in FIG. 2 are examples and do not describe every possible embodiment. Other embodiments may utilize fewer services or additional services. The embodiments illustrated in FIG. 2 should therefore not be interpreted to be exclusive or limiting, but rather illustrative.

In some example embodiments, the communications service provider 202 includes databases that include data related to the service delivery. The databases include email data 210, SMS data 212, and phone data 214. It is noted that the data resulting from the service delivery may be transient and not stored, or may be stored in the databases, according to the preferences set by the companies 104. Thus, some of the data may be saved in the databases, but not all the data. Further, anonymized data may be stored in the databases.

The companies 104, may use the data to improve their operations, such as building models to detect spam. However, if the data is not anonymized, each company is able to use its own data, but not the data from other companies 104. Further, it is noted that companies 104 will also protect the privacy of users 102 and the models built to detect spam will only be used as long as the privacy of the users 102 is protected.

The message content can be invaluable for improving the services, by reducing cost of delivery or providing new features. However, using the raw data may be prohibited (e.g., under GDPR and ePrivacy regulations) without directly acquiring consent from customers and their recipients.

However, the communications service provider 202 may proactively anonymize customer data in order to adhere to the principles of "privacy by default" and "data minimization," while complying with its obligation to delete customer data. Anonymized data is not subject to the same protections put forth by privacy regulations because it has no PII, thus enabling the communications service provider 202 to use anonymous data to improve services, e.g., reduce service-delivery cost, and provide new features to help customers better communicate with users 102.

Figure 3:
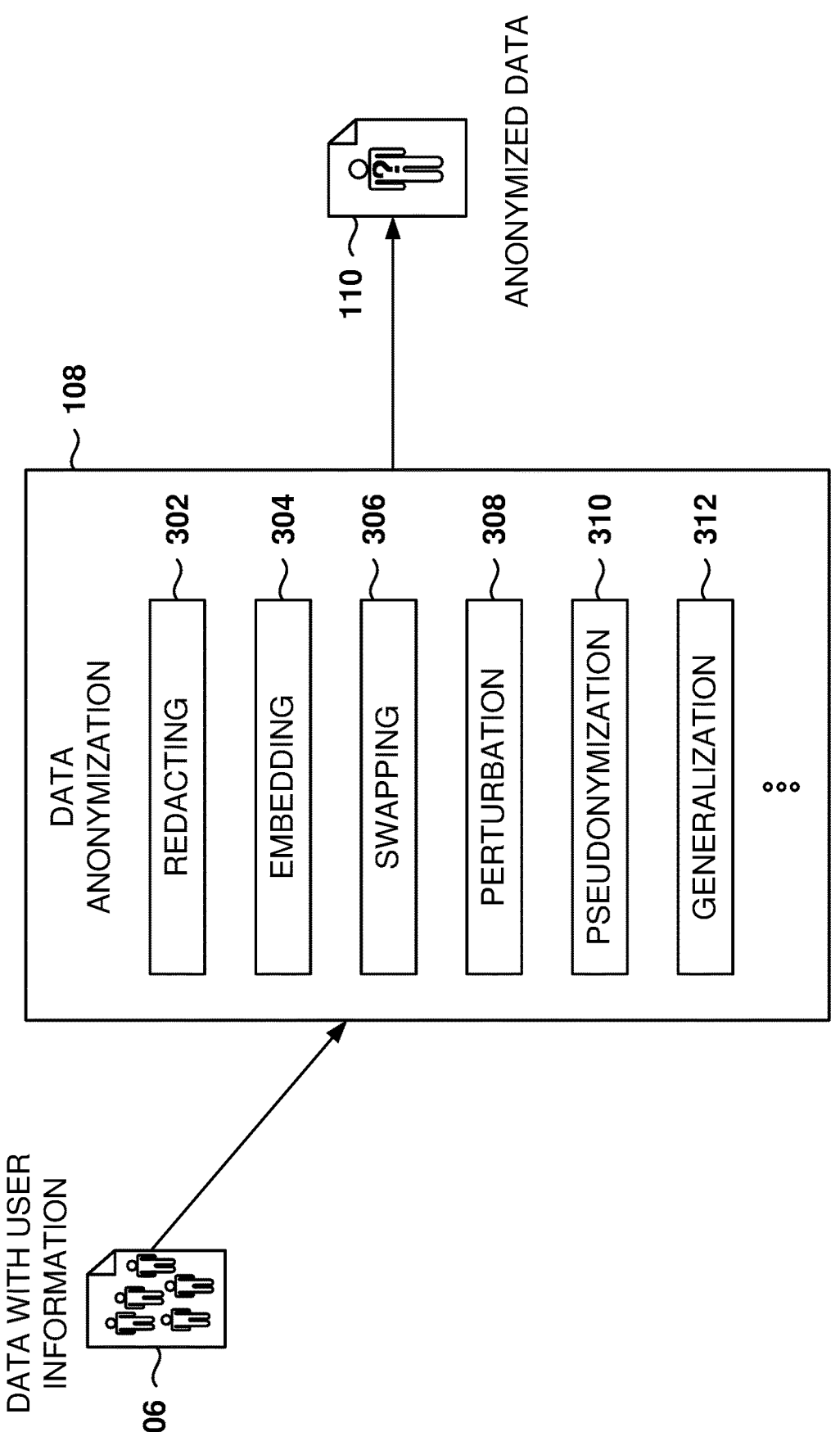
FIG. 3 illustrates sample techniques for data anonymization.

FIG. 3 illustrates sample techniques for data anonymization. In some example embodiments, there are multiple techniques for data anonymization 108, including redacting 302, embedding 304, swapping 306, perturbation 308, pseudonymization 310, generalization 312, etc.

Redacting 302 is the process of removing confidential information from the data, such as names, phone numbers, addresses, etc. Embedding 304 is the process of converting the data into a multidimensional vector containing numbers. More details are provided below regarding embedding 304 with reference to FIG. 4.

Swapping 306 is the process of replacing a piece of information with a related broader item, e.g., replacing "San Francisco" with "California." Perturbation 308 modifies the raw data slightly by applying techniques that round numbers and add random noise. The range of values is in proportion to the desired degree of perturbation.

Pseudonymization 310 is the process where PII data is replaced by one or more artificial identifiers, referred to as pseudonyms. Generalization 312 is the process of replacing a value with a less specific but semantically consistent value, e.g., replacing age value of "29" with a generic value of "between 20 and 30."

It is noted that the embodiments illustrated in FIG. 3 are examples and do not describe every possible embodiment. Other embodiments may utilize different anonymization techniques. The embodiments illustrated in FIG. 3 should therefore not be interpreted to be exclusive or limiting, but rather illustrative.

The anonymization techniques may be combined. For example, in one example embodiment anonymization includes redacting PII information (e.g., first name, last name, social security number, phone number, email address) followed by a process of embedding 304 to encode the data into vectors.

Figure 4:
FIG. 4 illustrates the process of embedding text information, according to some example embodiments.

FIG. 4 illustrates the process of embedding text information, according to some example embodiments. Feature extraction is a process to reduce the amount of resources required to describe a large set of data. When performing analysis of complex data, one of the major problems is one that stems from the number of variables involved. Analysis with a large number of variables generally makes use of a large amount of memory and computational power, and it may cause a classification algorithm to overfit to training samples and generalize poorly to new samples. Feature extraction includes constructing combinations of variables to get around these large-data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or a similar, amount of information.

As discussed above, embedding is the process of converting data into a multidimensional vector containing numbers. In the example illustrated in FIG. 4, a text document 408 is being embedded into a text vector that includes numbers. For example, the numbers in the small vectors may be binary numbers, integers, real numbers, or real numbers with a fixed number of decimals (e.g., four decimal places). The anonymous embeddings are irreversible transformations of discrete categorical variables (e.g., words 402) into the vector of numbers.

Semantic analysis 404 is performed on each word 402 of the text document 408, resulting in a word vector 406, also referred to as an embedding of the word 402. In some example embodiments, the semantic analysis 404 is based on a corpus of words and the resulting word vectors 406 are distributed throughout multidimensional space, such that words that are related (e.g., semantically similar) have vectors that are near each other, while words that are not related have vectors far apart from each other. Some examples of embedding techniques include TF-IDF vectorizer, count vectorizer, hashing vectorizer, and Word2Vec, At operation 410, the word vectors 406 are combined (e.g., concatenated or added) to generate a text vector 412, which is the embedding of the text document 408. The resulting text vector 412 provides anonymization because it is harder to obtain PII from the text vector 412 than from the original text document 408.

In some example embodiments, the resulting multidimensional vector contains the same semantic concepts as the original text document 408. For example, an article about pediatrics would have a text vector 412 that is close to the vector of an article about preventive medicine.

The resulting text vector 412 may be used to train a machine learning model, as described below with reference to FIG. 5. The embedding provides a level of anonymization for the data that is to be used in the building of the model. However, the degree of anonymization should be tested to guarantee that the PII may not be extracted from operating the model. More details about testing the data anonymization techniques are described below with reference to FIG. 8.

Figure 5:
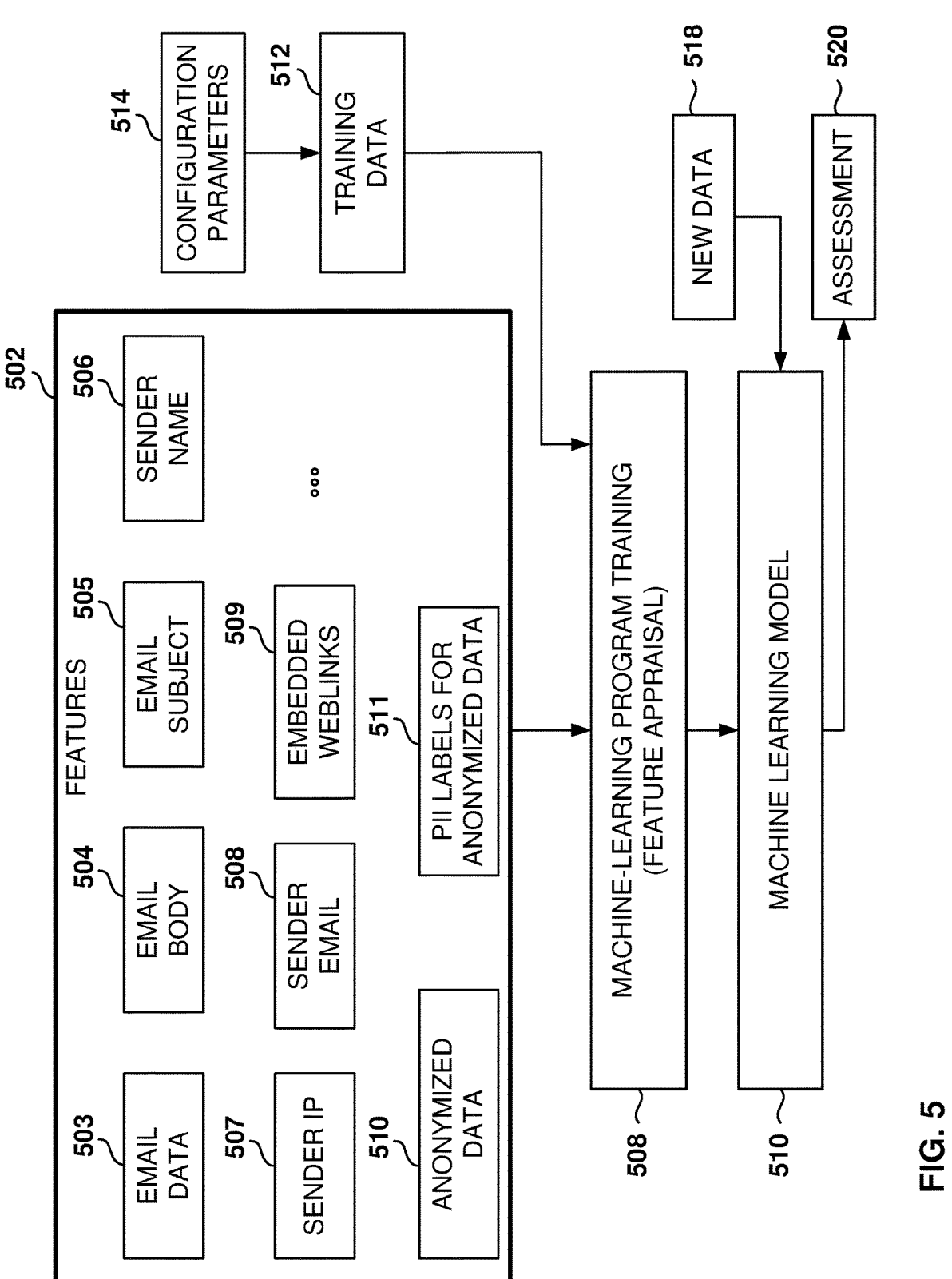
FIG. 5 is a representative diagram illustrating the training and use of a machine-learning program, according to some example embodiments.

FIG. 5 illustrates the training and use of a machine-learning program, according to some example embodiments. In some example embodiments, machine-learning programs (MLPs), also referred to as machine-learning algorithms or tools, are utilized to classify email messages, e.g., detecting spam or non-spam emails.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data 518. Such machine-learning algorithms operate by building an ML model 510 from example training data 512 in order to make data-driven predictions or decisions expressed as outputs or assessments 520. Although example embodiments are presented with respect to a few machine-learning tools, the principles presented herein may be applied to other machine-learning tools.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM). Some common tasks for unsupervised ML include clustering, representation learning, and density estimation. Some examples of commonly used unsupervised-ML algorithms are K-means clustering, principal component analysis, and autoencoders.

In some embodiments, example ML model 510 provides a determination if a message (e.g., email, SMS) is spam. Another model determines if the message is phishing for private information (e.g., logins, passwords). Further yet, another model extracts PII labels 511 from the anonymized data 510, as described in more detail below with reference to FIG. 8.

The training data 512 comprises examples of values for the features 502. In some example embodiments, the training data 512 comprises labeled data with examples of values for the features and labels indicating the outcome, such as the email data 503, the email body 504, the email subject 505, the sender name 506, the sender Internet Protocol (IP) address 507, the sender email 508, links embedded in the message 509, anonymized data 510, PII labels for anonymized data 511, and so forth. The machine-learning algorithms utilize the training data 512 to find correlations among identified features 502 that affect the outcome. A feature 502 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

During training 508, the ML algorithm analyzes the training data 512 based on identified features 502 and configuration parameters 514 defined for the training. The result of the training 508 is an ML model 510 that is capable of taking inputs (e.g., email message to be transmitted) to produce assessments (e.g., the email message is spam).

Training an ML algorithm involves analyzing large amounts of data (e.g., from several gigabytes to a terabyte or more) in order to find data correlations. The ML algorithms utilize the training data 512 to find correlations among the identified features 502 that affect the outcome or assessment 520. In some example embodiments, the training data 512 includes labeled data, which is known data for one or more identified features 502 and one or more outcomes, such as whether an email previously analyzed is spam or phishing.

The ML algorithms usually explore many possible functions and parameters before finding what the ML algorithms identify to be the best correlations within the data; therefore, training may make use of large amounts of computing resources and time.

Many ML algorithms include configuration parameters 514, and the more complex the ML algorithm, the more parameters there are that are available to the user. The configuration parameters 514 define variables for an ML algorithm in the search for the best ML model. The training parameters include model parameters and hyperparameters. Model parameters are learned from the training data, whereas hyperparameters are not learned from the training data, but instead are provided to the ML algorithm.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a very time-consuming task that makes use of a large amount of computer resources.

Figure 6:
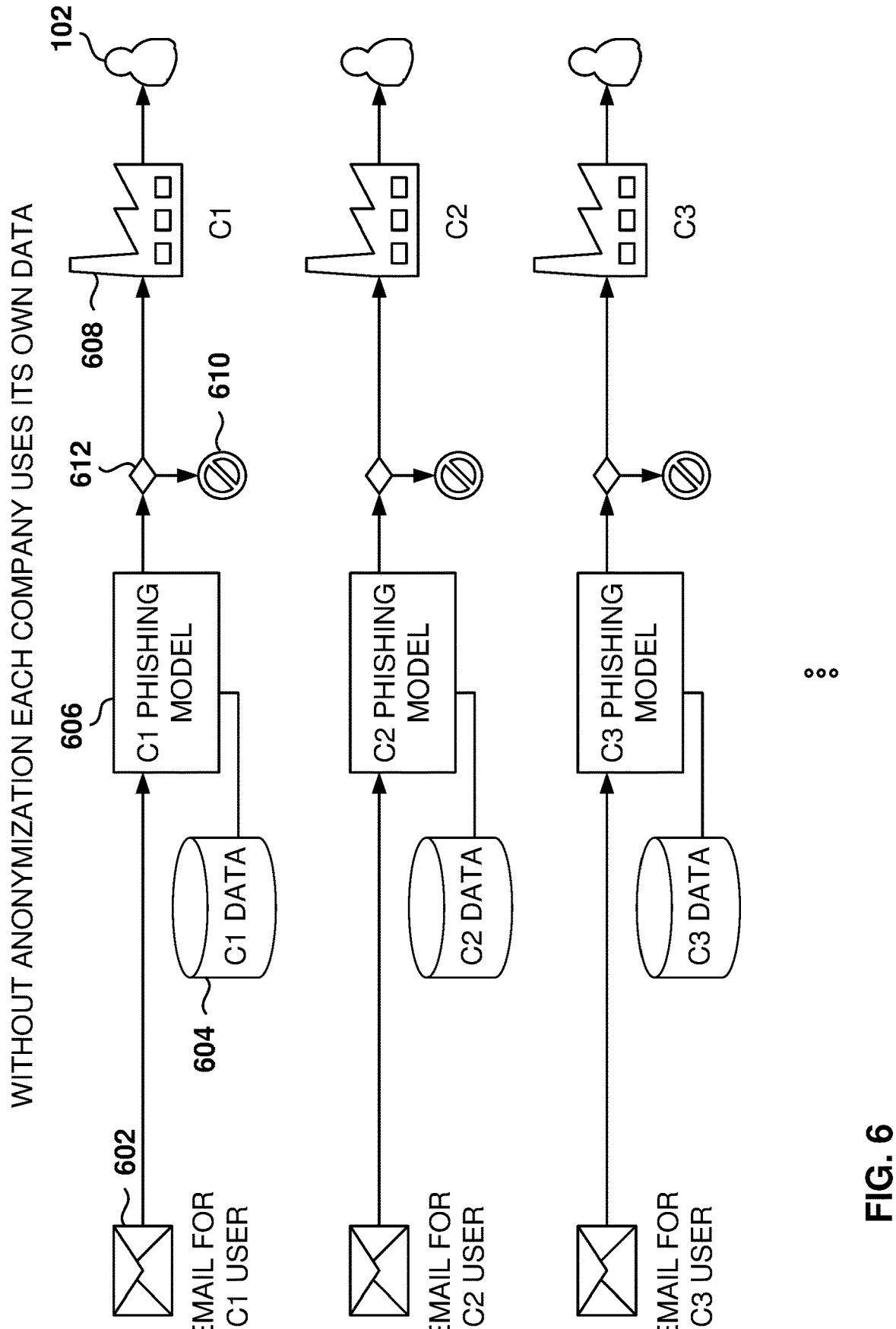
FIG. 6 illustrates how different companies used their own data for modeling purposes, according to some example embodiments.

FIG. 6 illustrates how different companies used their own data for modeling purposes, according to some example embodiments. In the illustrated example in FIG. 6, the communications service provider gathers data about the messages 602 sent or received by each client. However, when the data is not anonymized, the communications service provider may not use the data of one client to assist in a model used by another client because the data is confidential to each client.

In the illustrated example, the communications service provider or the client itself creates a model 606 for detecting if an email is phishing. Each client uses its own data C1 from past emails that were classified as phishing or not phishing.

When a new email is queued to be sent to user 102, the phishing model 606 determines 612 if the email is appropriate to send to the company 608 or the user 102, or if the email is phishing.

Typically, machine learning makes use of large amounts of data, and the better the data, the better the corresponding model will perform. However, some clients may be small and not have enough data to develop good models. Since the data is not anonymized, the communications service provider cannot use the available data for all the clients in order to assist some clients to build better models.

Figure 7:
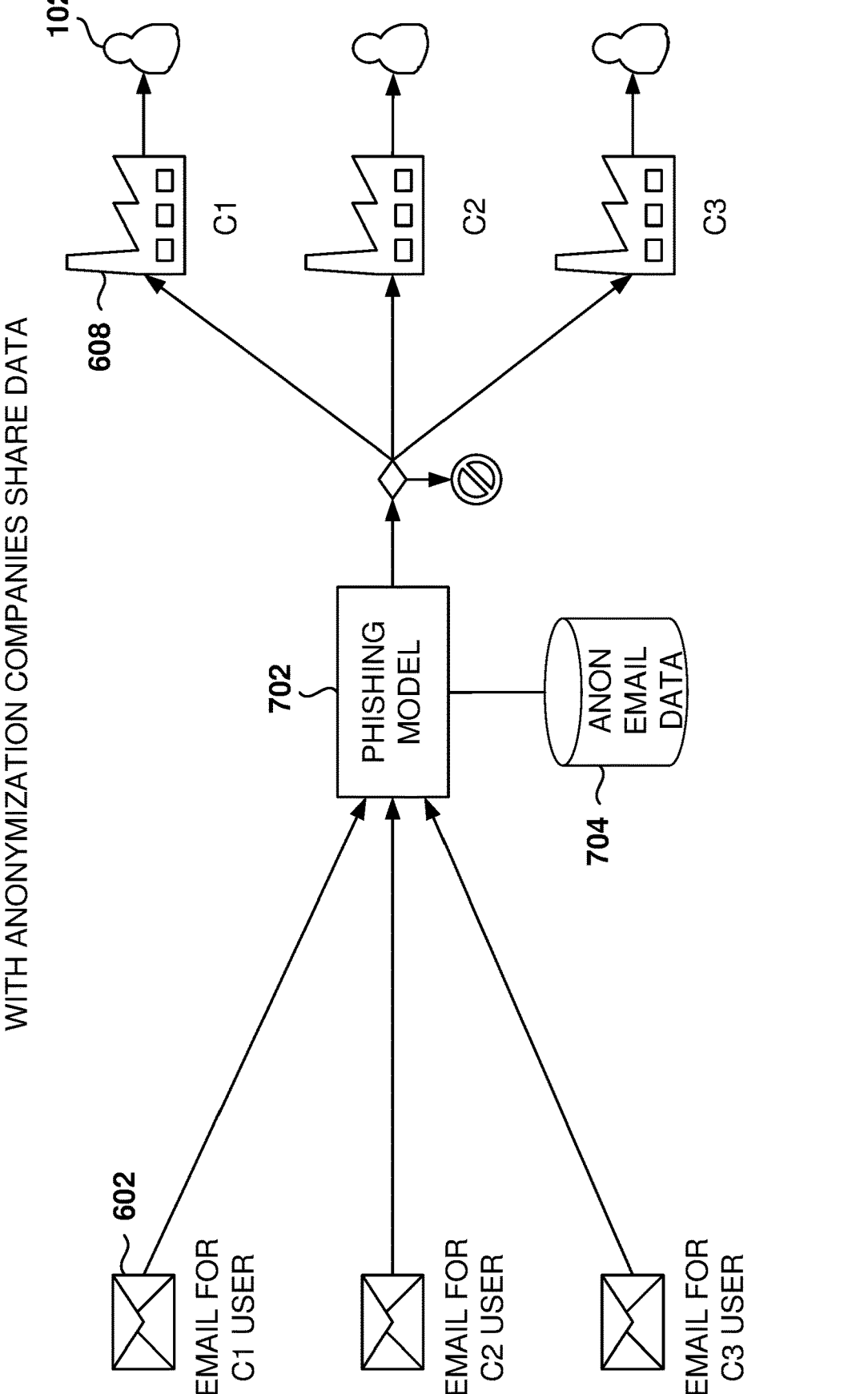
FIG. 7 illustrates how companies can benefit by sharing anonymized data to improve models, according to some example embodiments.

FIG. 7 illustrates how companies can benefit by sharing anonymized data to improve models, according to some example embodiments. In the illustrated example in FIG. 7, the anonymized email data 704 is used to build a model 702 that can be used to classify emails (e.g., detect phishing or spam).

When any email is received for any of the clients, the phishing model 702 is used to detect malicious emails. Further, if the communications service provider is building the models to be used for client communications, by having only to maintain one model, the complexity of operation is greatly reduced. Otherwise, having to build a different model for each client (e.g., as illustrated in FIG. 6) makes use of higher expenses in development and maintenance.

Figure 8:
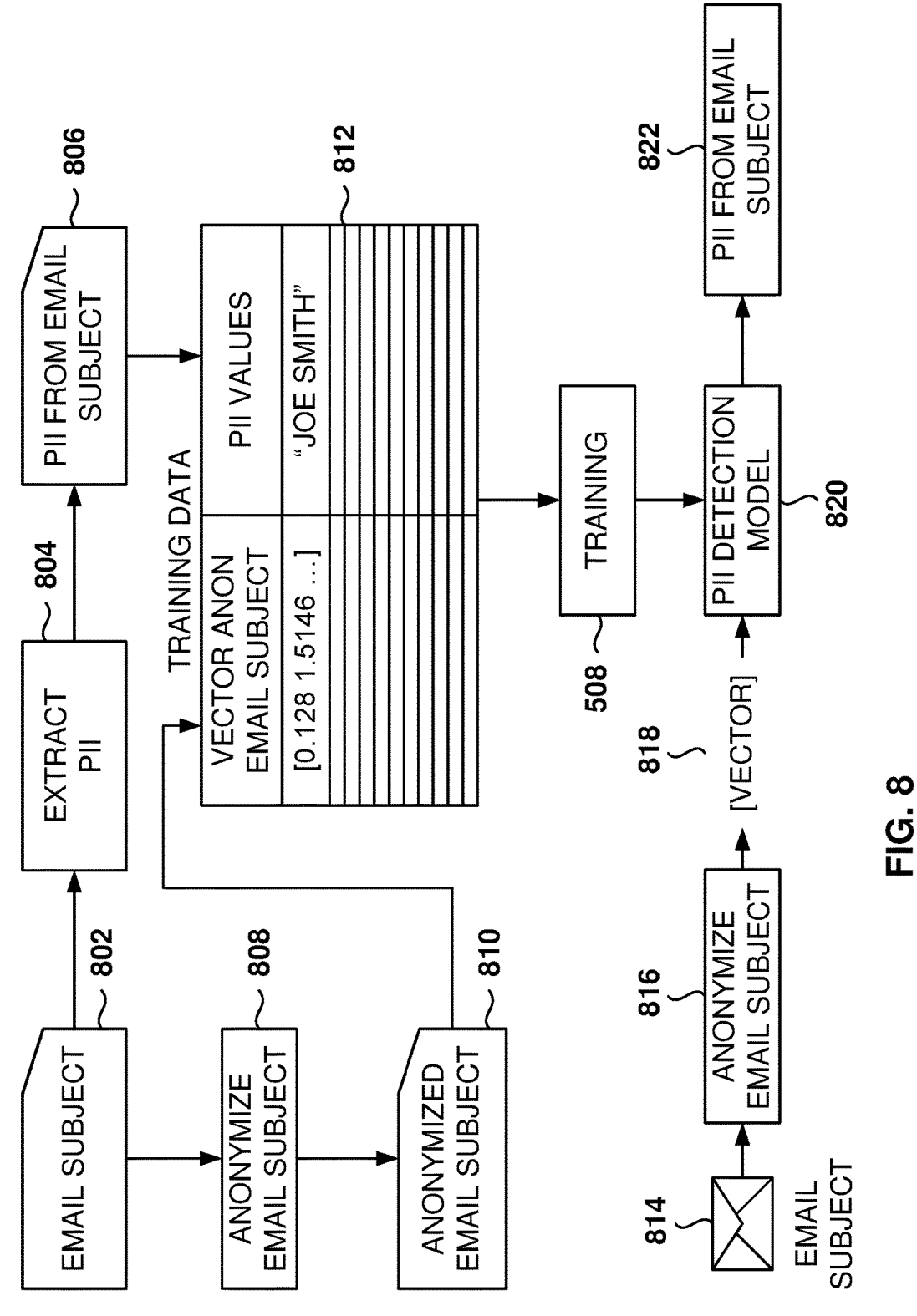
FIG. 8 illustrates the use of a model for extracting PII from anonymized data, according to some example embodiments.

FIG. 8 illustrates the use of a PII model 820 for extracting PII 822 from anonymized data, according to some example embodiments. When data is truly anonymized, the transformation of the data is irreversible such that it is impossible to identify the original PII associated with the data. Once the data is anonymized, the data needs to be tested to determine if it is really anonymized, that is, that no PII can be extracted from the data. To test for proper anonymization, the test has to prove that the anonymization process is irreversible, and that is practically impossible to identify data for a particular person.

There are multiple ways of testing for data anonymization. The illustrated example in FIG. 8, is for a test based on PII in the subject of emails, but other tests may utilize other user data, such as email body, SMS messages, etc. The embodiments illustrated in FIG. 8 should therefore not be interpreted to be exclusive or limiting, but rather illustrative.

In some example embodiments, a named-entity recognition program is used to extract 804 PII from the email subject 802 of a large (e.g., configurable) number of emails. The named-entity recognition program identifies the PII 806 from the email subjects.

In some example embodiments, the named-entity recognition includes detecting names of persons, email addresses, phone numbers, and Social Security numbers. Different tests may be performed based on the PII extracted, such as first name, last name, Social Security number, phone number, etc., or any combination thereof (e.g., first name and last name). In this example, the PII includes the first name and last name of people.

At operation 808, the email subject 802 data is anonymized to obtain a list of anonymized email subject 810. In some example embodiments, the anonymization 808 includes redacting and embedding into vectors (e.g., as described above with reference to FIG. 4), any data anonymization technique may be tested.

Training data 812 is then formed by creating a matrix where the first column includes the embedded vectors from the anonymized email subjects 810, and the second column includes the corresponding PII values from the email subject 806.

The training 508 uses the training data 812 to create the PII detection model 820 that detects PII in anonymized data. A new email 814 is then anonymized 816, resulting in vector 818. The vector 818 is used as the input to the PII detection model 820, and the output of the PII detection model 820 is the PII 822 found in the email subject, if any.

Figure 9:
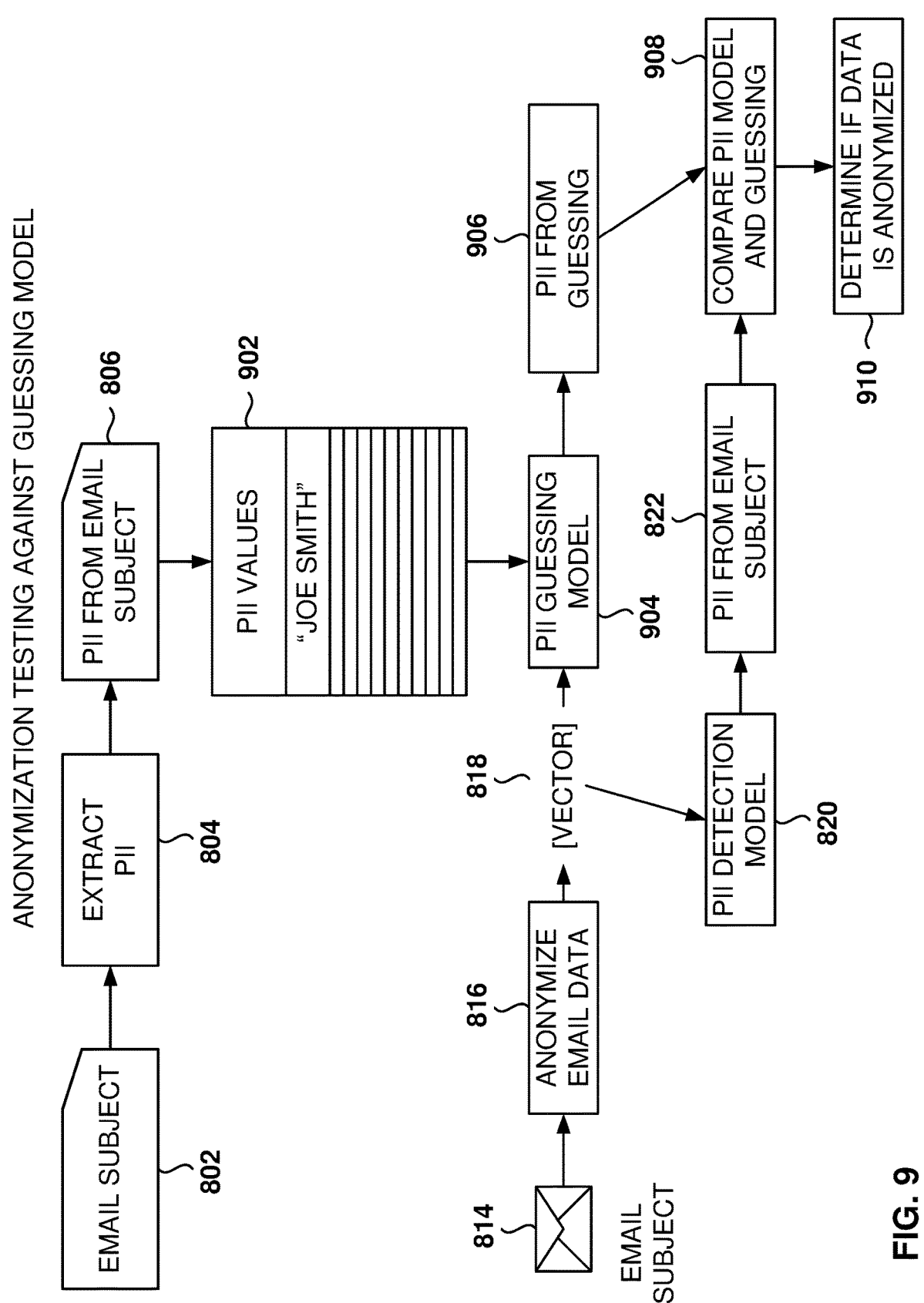
FIG. 9 illustrates the testing of data anonymization, according to some example embodiments.

FIG. 9 illustrates the testing of data anonymization, according to some example embodiments. To test for data anonymization, the PII model described in FIG. 8 is compared to a PII guessing model 904 that makes random guesses. In some example embodiments, the PII guessing model 904 utilizes a machine-learning model to generate guesses, but other embodiments utilize heuristics (e.g., random selection from a list) to make the guesses.

The PII values 902 are used by the PII guessing model 904 that simply makes random selections from the PII values 902. In some example embodiments, the selection is random from the list of PII values 902. In other example embodiments, the random selection is based on the frequency that the PII values appear in the email subject 802 data, e.g., the selection of name "John" is weighted based on the number of times the name "John" appears in the PII values 902 relative to the number of times that other names appear.

When the new email subject 814 is analyzed by the PII guessing model 914, the output is PII values resulting from guessing 906. The outputs from the PII detection model 920 and the PII guessing model 904 are compared 908 to determine 910 if the data is truly anonymized using the anonymization techniques.

More details are provided below with reference to FIG. 10 describing how the outputs from the models are compared and how the determination is made if the data is truly anonymized.

Although one email subject 814 is illustrated, the testing for anonymization involves testing a large number of email subjects (e.g., in the range from 100 to 10,000, but other values are also possible), and then determining the performance of the PII detection model based on the results for all the email subjects. All the email subjects used for testing anonymization are referred to herein as the testing set.

Figure 10:
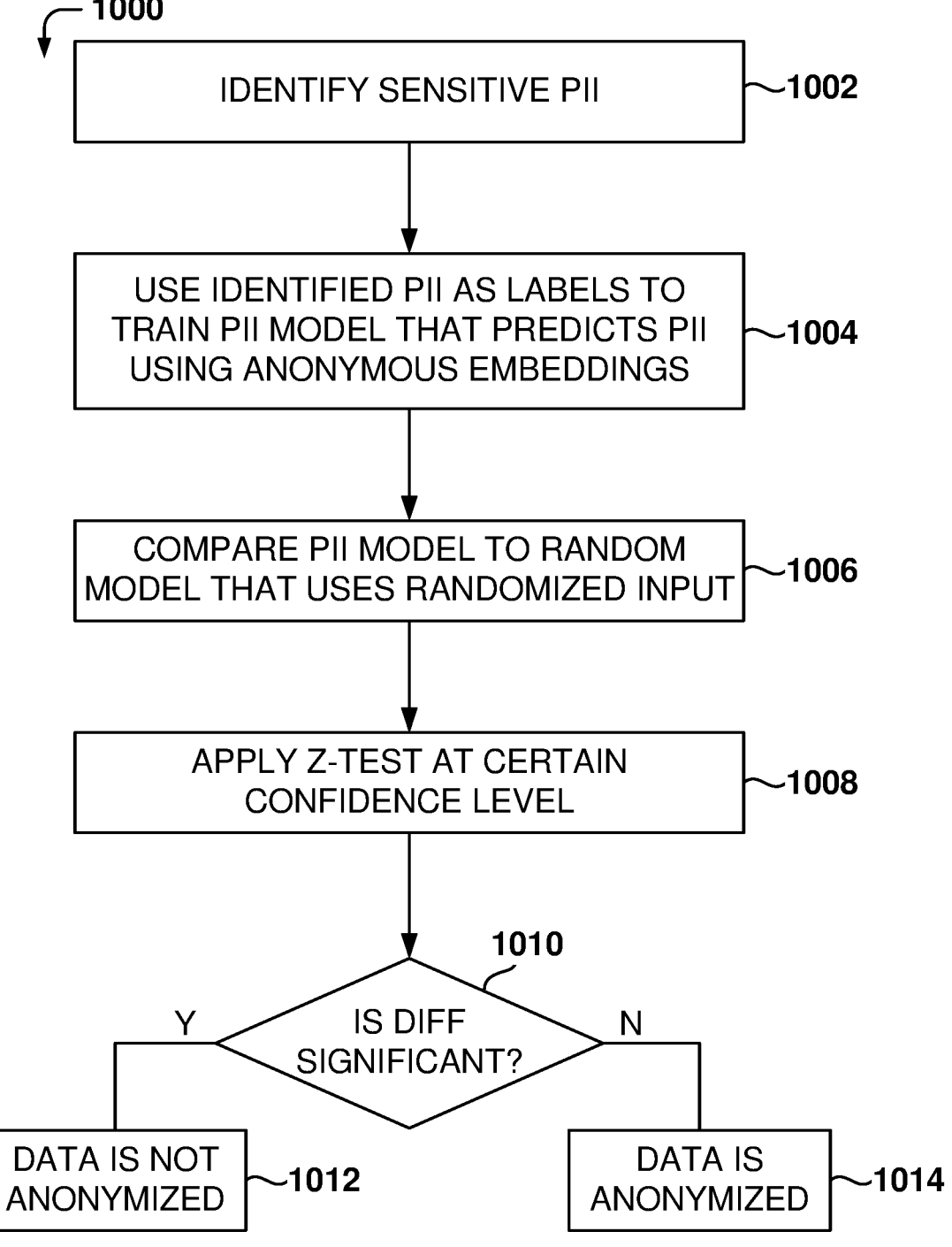
FIG. 10 is a flowchart of a method for testing data anonymization, according to some example embodiments.

FIG. 10 is a flowchart of a method for testing data anonymization, according to some example embodiments. While the various operations in this flowchart are presented and described sequentially, one of ordinary skill will appreciate that some or all of the operations may be executed in a different order, be combined or omitted, or be executed in parallel.

In some example embodiments, the flowchart 1000 illustrates the process for testing data anonymization. At operation 1002, sensitive PII data is identified in the data.

From operation 1002, the method flows to operation 1004 for using the identified PII data as labels to train a PII model that predicts presence of PII using anonymous embeddings. That is, the PII model predicts the existence of PII in the data.

At operation 1006, the PII model is compared to the guessing model that produces random outputs from the list of PII extracted from the data. In some example embodiments, the accuracy of the guesses corresponds to the probability of the event. For example, if an event X occurs 10% of the time, the guessing model should guess X 10% of the time, and the resulting accuracy of the guessing model would be 10%×10% or 1%. That is, even with a random model, there's a certain degree of accuracy, which implies no information is known. However, just because there is no known information, it does not mean that the accuracy of the random model is 0%.

In some example embodiments, a Z-test is performed to determine if the performance is equivalent to guessing. However, other embodiments my use other types of test to determine if the performance with the anonymized data is the same as guessing to determine PII.

A Z-test is a statistical test for which the distribution of the test statistic under the null hypothesis can be approximated by a normal distribution. The Z-test checks the mean of a distribution in which the population variance $\sigma^2$ is known. For each significance level in the confidence interval, the Z-test has a single critical value (for example, 1.96 for 5% two tailed) which makes it more convenient than other tests that have separate and different critical values for each sample size. Therefore, many statistical tests can be conveniently performed as approximate Z-tests if the sample size is large or the population variance is known. In some example embodiments, the difference between the random and the evaluated model, to prove data anonymization, is statistically indistinguishable at a 95% confidence interval.

At operation 1008, a Z-test is performed at a predetermined level, e.g., p=0.05 (e.g., 105% confidence level), but other values are also possible (e.g., in the range from 0.01 to 0.4). If the test fails, it is considered that the model that predicts PII using the anonymous embeddings is "practically equivalent" to guessing; therefore, the anonymized data is safe for use in the model while protecting user privacy.

In some example embodiments, the Z-test uses the following equation:

$$Z = \frac{\hat{p}_1 - \hat{p}_2}{\sqrt{p(1-p)\left(\frac{1}{n_1} + \frac{1}{n_2}\right)}}$$

Here, z is the score to be calculated, $\hat{p}_1$ is the accuracy of the model trained on anonymized data, and $\hat{p}_2$ is the accuracy of the model that guesses based on randomized input. The z-score Z is the difference between the accuracies in standard deviations of the two models. The p-value p is the complement of the confidence value (e.g., for a 95% confidence, p is 5%) and is defined as the largest probability of obtaining test results at least as extreme as the results actually observed, under the assumption that the null hypothesis is correct.

Further, $n_1$ is the number of samples for $p_1$, and $n_2$ is the number of samples for $p_1$. To test data anonymization, the goal is to disprove that $p_1 > p_2$ with statistical significance. This testing to prove anonymization is independent of the underlying model that uses the data. Assuming the random difference between the two accuracies follows a normal distribution, we can use the z-score to calculate the probability that the observed difference in the accuracy of the models is due to random fluctuation. If this probability is high enough (e.g., 95%) then we consider the difference in accuracy between the models is considered not statistically significant (e.g., the accuracy of one is "functionally equivalent" to the accuracy of the other).

In some cases, the testing may be used to determine the level of information that some data provides. For example, location can vary from identifying a country to identifying a street. Knowing the country is not enough information to identify that certain data belongs to the user. However, if the street is provided, it will be easier to identify an individual when that information is combined with other information, such as age or race. The test then enables to determine if given the street location could be anonymized data or not.

At operation 1010, the difference between the results provided by the PII extraction model and the guessing model are compared. If the difference is significant (e.g., based on the values of the Z-test at the predetermined confidence level), then the data is not anonymized 1012 because the PII extraction model performs better than just guessing. If the difference is not significant, then the data is considered to be anonymized 1014.

Figure 11:
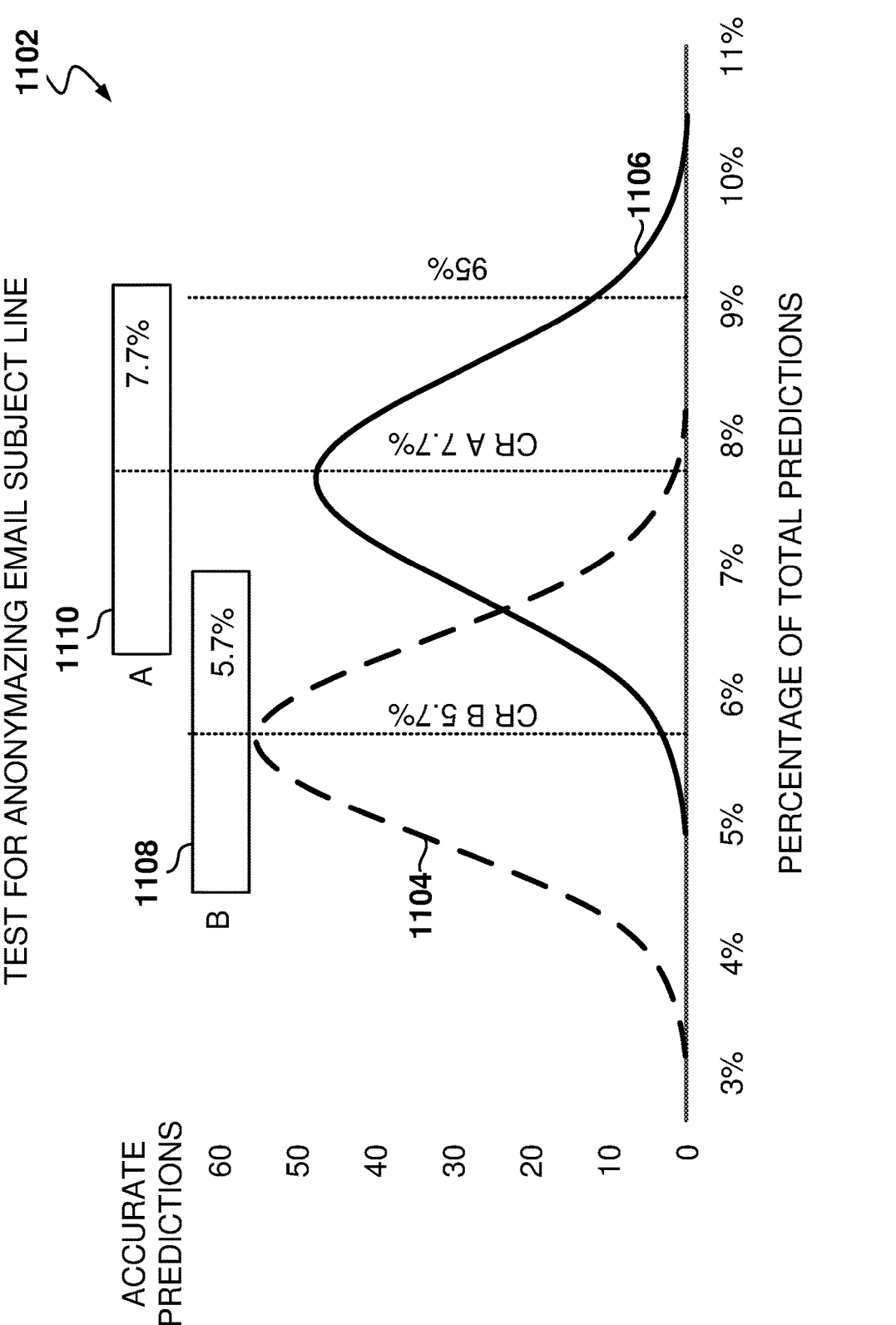
FIG. 11 is a graph showing sample results of a process for data anonymization, according to some example embodiments.

FIG. 11 shows sample results of a process for data anonymization, according to some example embodiments. In one example, a test was performed to determine if data for the model is anonymous data or not. The sample model is a model built for anonymizing the subject line of an email.

Chart 1102 shows a distribution of the accuracy of predictions for model A 1106, which is the model to be tested, and model B 1104, which is the random guessing model. The Z-test failed to prove a statistically significant difference in accuracy between the guessing model and the model trained on anonymous embeddings.

The average accuracy for model B is 5.7% (1108) and 7.7% (1110) for model A. The 95% confidence level for model A covers from about 6.8% to 11.2%, and for model B covers from about 6.5% to 11.1%. The ranges overlap, therefore, at the 95% confidence level, the anonymous embeddings are indistinguishable from guessing used to identify PII.

In another test, performance of models for detecting phishing emails was compared, with one model utilizing non-anonymized embeddings and the second model utilizing anonymized embeddings. The performance of the model with anonymized data was within ±5% accuracy when compared to the model with the non-anonymized embeddings. This proved that it is possible to develop working models with anonymized data.

FIG. 12 is a flowchart of a method 1200 for testing if a data set is anonymized, according to some example embodiments. While the various operations in this flowchart are presented and described sequentially, one of ordinary skill will appreciate that some or all of the operations may be executed in a different order, be combined or omitted, or be executed in parallel.

At operation 1202, training data is generated. The training data includes anonymized user data created by anonymizing communications data for a plurality of users and PII extracted from the communications data.

From operation 1202, the method 1200 flows to operation 1204 where one or more processors train a machine-learning program with the training data to generate a PII detection model that extracts PII values from input data.

From operation 1204, the method 1200 flows to operation 1206 for extracting, by the PII detection model executing on the one or more processors, PII values from a testing set that includes test anonymized communications data.

At operation 1208, the performance of the PII detection model to extract the PII values is compared to the performance of a guessing model that randomly guesses PII values in the test anonymized communications data.

From operation 1208, the method 1200 flows to operation 1210 to determine if the anonymizing of the communications data is a valid anonymizing process based on the comparison.

In one example, the anonymizing for a communication from a user includes redacting text of the communication from the user to delete PII values and embedding the redacted text into a vector.

In one example, the training data comprises a matrix, each row of the matrix corresponding to one communication from a user, each row including a vector for the anonymized communication from the user and PII information in the communication from the user.

In one example, the PII is extracted from a text of an email message.

In one example, the guessing model guesses at random one value from a list of PII values found in the communications data based on a frequency of appearance of each PII value.

In one example, the comparing is based on a z-test based on a distribution of the PII values at a predefined confidence level, the z-test determining if the performance of the PII detection model is the same as the performance of the guessing model within the predefined confidence level.

In one example, determining if the anonymizing of the communications data is valid comprises determining a difference between the performance of the guessing model and the performance of the PII detection model, and determining the performances are equivalent when the difference is below a predetermined level.

In one example, the communications data is one of email communications or Short Message Service (SMS) communications.

In one example, the PII extracted from the communications data includes first name and last name.

In one example, the method 1200 further comprises building a first model with anonymized data and a second model without anonymized data, comparing the performance of the first model and the second model to detect malicious communications, and determining that the first model is valid to detect malicious communications based on the comparison.

Another general aspect is for a system that includes a memory comprising instructions and one or more computer processors. The instructions, when executed by the one or more computer processors, cause the one or more computer processors to perform operations comprising: generating training data that includes anonymized user data created by anonymizing communications data for a plurality of users, and personally identifiable information (PII) extracted from the communications data; training a machine-learning program with the training data to generate a PII detection model that extracts PII values from input data; extracting, by the PII detection model, PII values from a testing set that includes test anonymized communications data; comparing a performance of the PII detection model to extract the PII values to a performance of a guessing model that randomly guess PII values in the test anonymized communications data; and determining if the anonymizing of the communications data is a valid anonymizing process based on the comparison.

In yet another general aspect, a machine-readable storage medium (e.g., a non-transitory storage medium) includes instructions that, when executed by a machine, cause the machine to perform operations comprising: generating training data that includes anonymized user data created by anonymizing communications data for a plurality of users, and personally identifiable information (PII) extracted from the communications data; training a machine-learning program with the training data to generate a PII detection model that extracts PII values from input data; extracting, by the PII detection model, PII values from a testing set that includes test anonymized communications data; comparing a performance of the PII detection model to extract the PII values to a performance of a guessing model that randomly guess PII values in the test anonymized communications data; and determining if the anonymizing of the communications data is a valid anonymizing process based on the comparison.

Figure 13:
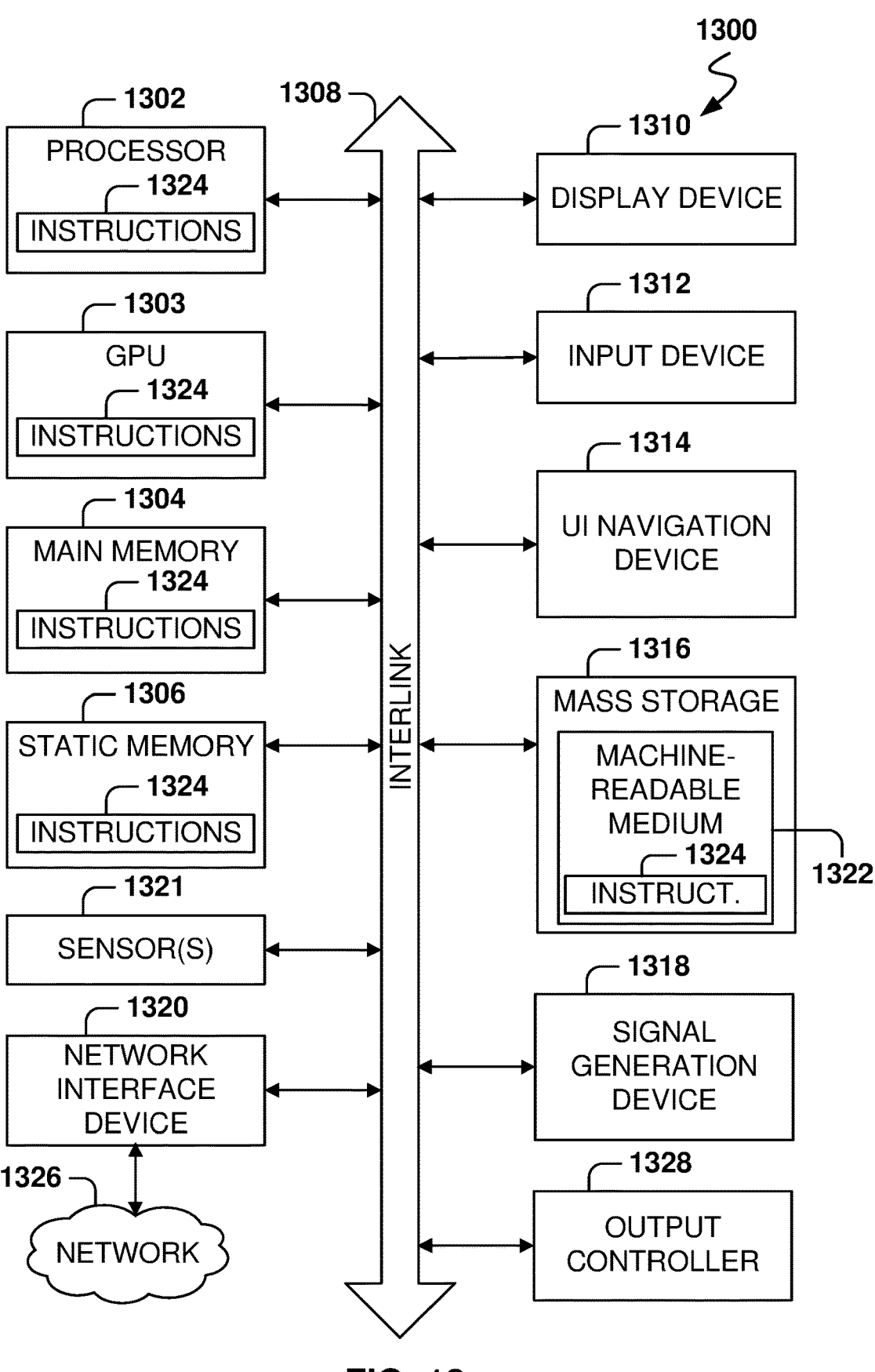
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:

generating training data associated with electronic messages to be transmitted by a plurality of users, wherein the training data correlates anonymized communications data created by anonymizing the electronic messages to be transmitted by the plurality of users to personally identifiable information (PII) extracted from the electronic messages to be transmitted by the plurality of users, wherein the electronic messages comprise one or more of email messages or short message service (SMS) messages, and wherein anonymizing the electronic messages comprises redacting text of a communication to delete one or more PII values and embedding the redacted text into a vector;

training, by one or more processors and based on the training data associated with the electronic messages to be transmitted by the plurality of users, a machine-learning program to generate a PII detection model that extracts PII values from input electronic messages;

extracting, by the PII detection model executing on the one or more processors, PII values from anonymized testing electronic messages;

determining differences between the extracted PII values obtained from the PII detection model and randomly generated PII values obtained from a random value model that randomly generates PII values using a list of PII values found in the anonymized testing electronic messages based on frequencies of appearance; and responsive to the determined differences between the extracted PII values and the randomly generated PII values being below a predetermined confidence level, determining that anonymization of the electronic messages is valid based on the PII detection model; and causing spam detection to be performed using the electronic messages anonymized based on the PII detection model.

2. The method as recited in claim 1, wherein the training data comprises a matrix, each row of the matrix including PII extracted from a corresponding communication and including a vector that anonymizes the corresponding communication.

3. The method as recited in claim 1, wherein the extracted PII values include a PII value extracted from a text of an email message.

4. The method as recited in claim 1, wherein the random value model is trained to randomly generate a PII value based on the list of PII values found in the anonymized testing electronic messages based on the frequencies of appearance.

5. The method as recited in claim 1, wherein the determining of the differences between the extracted PII values and the randomly generated PII values is based on a difference between a first accuracy in first standard deviations of the PII detection model and a second accuracy in second standard deviations of the random value model.

6. The method as recited in claim 1, further comprising:

responsive to the determined differences between the extracted PII values and the randomly generated PII values transgressing the predetermined confidence level, determining that the anonymized testing electronic messages were insufficiently anonymized based on the PII detection model, wherein the determining that the anonymized testing electronic messages were insufficiently anonymized comprises:

determining a difference between a first performance of the PII detection model and a second performance of the random value model; and determining that the first and second performances are equivalent when the difference is below a predetermined level.

7. The method as recited in claim 1, wherein the extracted PII values include a first name and a last name.

8. A system comprising:

a memory comprising instructions; and one or more computer processors, wherein the instructions, when executed by the one or more computer processors, cause the system to perform operations comprising:

generating training data associated with electronic messages to be transmitted by a plurality of users, wherein the training data correlates anonymized communications data created by anonymizing the electronic messages to be transmitted by the plurality of users to personally identifiable information (PII) extracted from the electronic messages to be transmitted by the plurality of users, wherein the electronic messages comprise one or more of email messages or short message service (SMS) messages, and wherein anonymizing the electronic messages comprises redacting text of a communication to delete one or more PII values and embedding the redacted text into a vector;

training, based on the training data associated with the electronic messages to be transmitted by the plurality of users, a machine-learning program to generate a PII detection model that extracts PII values from input electronic messages;

extracting, by the PII detection model executing on the one or more computer processors, PII values from anonymized testing electronic messages;

determining differences between the extracted PII values obtained from the PII detection model and randomly generated PII values obtained from a random value model that randomly generates PII values using a list of PII values found in the anonymized testing electronic messages based on frequencies of appearance; and responsive to the determined differences between the extracted PII values and the randomly generated PII values being below a predetermined confidence level, determining that anonymization of the electronic messages is valid based on the PII detection model; and causing spam detection to be performed using the electronic messages anonymized based on the PII detection model.

9. The system as recited in claim 8, wherein the training data comprises a matrix, each row of the matrix including PII extracted from a corresponding communication and including a vector that anonymizes the corresponding communication.

10. The system as recited in claim 8, wherein the random value model is trained to randomly generate a PII value based on the list of PII values found in the anonymized testing electronic messages based on the frequencies of appearance.

11. The system as recited in claim 8, wherein the determining of the differences between the extracted PII values and the randomly generated PII values is based on a difference between a first accuracy in first standard deviations of the PII detection model and a second accuracy in second standard deviations of the random value model.

12. A non-transitory machine-readable storage medium including instructions that, when executed by one or more processors of a machine, cause the machine to perform operations comprising:

generating training data associated with electronic messages to be transmitted by a plurality of users, wherein the training data correlates anonymized communications data created by anonymizing the electronic messages to be transmitted by the plurality of users to personally identifiable information (PII) extracted from the electronic messages to be transmitted by the plurality of users, wherein the electronic messages comprise one or more of email messages or short message service (SMS) messages, and wherein anonymizing the electronic messages comprises redacting text of a communication to delete one or more PII values and embedding the redacted text into a vector;

training, based on the training data associated with the electronic messages to be transmitted by the plurality of users, a machine-learning program to generate a PII detection model that extracts PII values from input electronic messages;

extracting, by the PII detection model executing on the one or more processors, PII values from anonymized testing electronic messages;

determining differences between the extracted PII values obtained from the PII detection model and randomly generated PII values obtained from a random value model that randomly generates PII values using a list of PII values found in the anonymized testing electronic messages based on frequencies of appearance; and responsive to the determined differences between the extracted PII values and the randomly generated PII values being below a predetermined confidence level, determining that anonymization of the electronic messages is valid based on the PII detection model; and causing spam detection to be performed using the electronic messages anonymized based on the PII detection model.

13. The non-transitory machine-readable storage medium as recited in claim 12, wherein the training data comprises a matrix, each row of the matrix including PII extracted from a corresponding communication and including a vector that anonymizes the corresponding communication.

14. The non-transitory machine-readable storage medium as recited in claim 12, wherein the random value model is trained to randomly generate a PII value based on the list of PII values found in the anonymized testing electronic messages based on the frequencies of appearance.

15. The non-transitory machine-readable storage medium as recited in claim 12, wherein the determining of the differences between the extracted PII values and the randomly generated PII values is based on a difference between a first accuracy in first standard deviations of the PII detection model and a second accuracy in second standard deviations of the random value model.

16. The system as recited in claim 8, the operations further comprising:

responsive to the determined differences between the extracted PII values and the randomly generated PII values transgressing the predetermined confidence level, determining that the anonymized testing electronic messages were insufficiently anonymized based on the PII detection model, wherein the determining that the anonymized testing electronic messages were insufficiently anonymized comprises:

determining a difference between a first performance of the PII detection model and a second performance of the random value model; and determining that the first and second performances are equivalent when the difference is below a predetermined level.

17. The non-transitory machine-readable storage medium as recited in claim 12, the operations further comprising:

responsive to the determined differences between the extracted PII values and the randomly generated PII values transgressing the predetermined confidence level, determining that the anonymized testing electronic messages were insufficiently anonymized based on the PII detection model, wherein the determining that the anonymized testing electronic messages were insufficiently anonymized comprises:

determining a difference between a first performance of the PII detection model and a second performance of the random value model; and determining that the first and second performances are equivalent when the difference is below a predetermined level.

* * * * *